US012579203B2

(12) United States Patent
Diesendruck et al.

(10) Patent No.: US 12,579,203 B2
(45) Date of Patent: Mar. 17, 2026

(54) AUTOMATIC GENERATION OF CONTENT FOR QUERY MATCHING IN FOUNDATION MODEL-BASED CONTENT PROVIDING SYSTEMS

(71) Applicant: MICROSOFT TECHNOLOGY LICENSING, LLC, Redmond, WA (US)

(72) Inventors: Maurice Diesendruck, Bellevue, WA (US); Jianzhe Lin, Redmond, WA (US); Gayathri Mahalingam, Bothell, WA (US); Shima Imani, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/742,504

(22) Filed: Jun. 13, 2024

(65) Prior Publication Data

US 2025/0384093 A1    Dec. 18, 2025

(51) Int. Cl.
*G06F 16/9532* (2019.01)
*G06F 16/951* (2019.01)
*G06F 16/957* (2019.01)

(52) U.S. Cl.
CPC ........ *G06F 16/9532* (2019.01); *G06F 16/951* (2019.01); *G06F 16/957* (2019.01)

(58) Field of Classification Search
CPC ... G06F 16/9532; G06F 16/951; G06F 16/957
USPC ....................................................... 707/706
See application file for complete search history.

(56) References Cited

U.S. PATENT DOCUMENTS

| | | | | |
|---|---|---|---|---|
| 12,105,755 | B1 * | 10/2024 | Omar ..................... | G06N 3/045 |
| 2012/0185519 | A1 * | 7/2012 | Rolland .................. | G06F 16/58 |
| | | | | 707/822 |
| 2017/0235848 | A1 * | 8/2017 | Van Dusen ........ | G06Q 30/0201 |
| | | | | 705/12 |
| 2018/0268307 | A1 * | 9/2018 | Kobayashi .............. | G06N 5/04 |
| 2020/0073899 | A1 * | 3/2020 | Weitz ................... | G06F 16/951 |
| 2022/0101836 | A1 * | 3/2022 | Prabhavalkar ........ | G10L 15/187 |
| 2022/0269870 | A1 * | 8/2022 | Goel ...................... | G06F 40/53 |

FOREIGN PATENT DOCUMENTS

WO    WO-2022260669 A1 *  12/2022

* cited by examiner

*Primary Examiner* — Kuen S Lu
(74) *Attorney, Agent, or Firm* — Newport IP, LLC; Jacob P. Rohwer

(57)            ABSTRACT

The disclosed system optimizes, via the use of foundation models such as large language models (LLMs), the manner in which a search engine associates instances of content (e.g., webpages) with a query. The system employs a first foundation model to summarize an instance of content. The system the employs a second foundation model to compare the summary of the instance of content generated by the first foundation model to target characteristics defined by a content creator. If the comparison confirms that the summary of the instance of aligns with the target characteristics, the system provides the summary to a search engine for query matching purposes. If the comparison denies that the summary of the instance of aligns with the target characteristics, the system employs the first foundation model to re-summarize the instance of content using feedback received from the second foundation model.

20 Claims, 7 Drawing Sheets

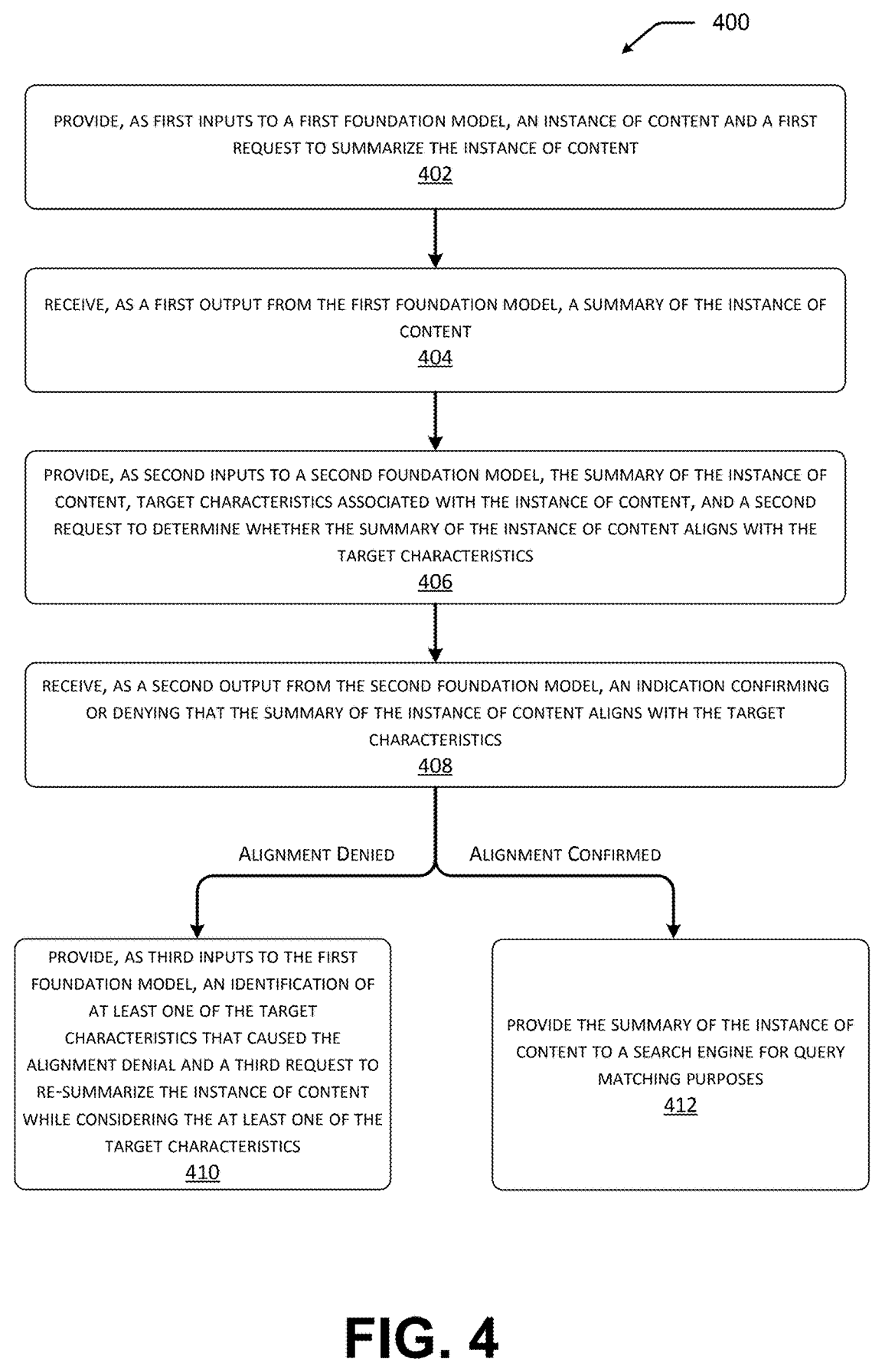

400

PROVIDE, AS FIRST INPUTS TO A FIRST FOUNDATION MODEL, AN INSTANCE OF CONTENT AND A FIRST REQUEST TO SUMMARIZE THE INSTANCE OF CONTENT
402

RECEIVE, AS A FIRST OUTPUT FROM THE FIRST FOUNDATION MODEL, A SUMMARY OF THE INSTANCE OF CONTENT
404

PROVIDE, AS SECOND INPUTS TO A SECOND FOUNDATION MODEL, THE SUMMARY OF THE INSTANCE OF CONTENT, TARGET CHARACTERISTICS ASSOCIATED WITH THE INSTANCE OF CONTENT, AND A SECOND REQUEST TO DETERMINE WHETHER THE SUMMARY OF THE INSTANCE OF CONTENT ALIGNS WITH THE TARGET CHARACTERISTICS
406

RECEIVE, AS A SECOND OUTPUT FROM THE SECOND FOUNDATION MODEL, AN INDICATION CONFIRMING OR DENYING THAT THE SUMMARY OF THE INSTANCE OF CONTENT ALIGNS WITH THE TARGET CHARACTERISTICS
408

ALIGNMENT DENIED          ALIGNMENT CONFIRMED

PROVIDE, AS THIRD INPUTS TO THE FIRST FOUNDATION MODEL, AN IDENTIFICATION OF AT LEAST ONE OF THE TARGET CHARACTERISTICS THAT CAUSED THE ALIGNMENT DENIAL AND A THIRD REQUEST TO RE-SUMMARIZE THE INSTANCE OF CONTENT WHILE CONSIDERING THE AT LEAST ONE OF THE TARGET CHARACTERISTICS
410

PROVIDE THE SUMMARY OF THE INSTANCE OF CONTENT TO A SEARCH ENGINE FOR QUERY MATCHING PURPOSES
412

FIG. 4

AUTOMATIC GENERATION OF CONTENT FOR QUERY MATCHING IN FOUNDATION MODEL-BASED CONTENT PROVIDING SYSTEMS

Search engines (e.g., GOOGLE, BING) typically use keyword matching to associate instances of content, e.g., webpages accessible via uniform resource locators (URLs) or other types of uniform resource identifiers (URIs), with a query. The keyword matching is used to rank and/or select the instances of the content for optimal display positions, e.g., within a search engine results page (SERP). However, comparing the words submitted in a query to all the words included various instances of content can be costly and slow.

SUMMARY

The system disclosed herein is configured to optimize, via the use of foundation models such as large language models (LLMs), the manner in which a search engine associates instances of content (e.g., webpages or applications ("apps") accessible via uniform resource locators (URLs) or other types of uniform resource identifiers (URIs)) with a query. A foundation model is a machine or deep learning model that is initially trained on broad data such that it can be applied across a wide range of use cases related to artificial intelligence (AI) and generative AI. An instance of content is generated by a content creator. The content creator is an entity (e.g., a person, a company, an agency, an organization, an institution) that offers a product and/or a service or publicizes information that is searchable by users of the Internet. Accordingly, examples of an instance of content include an entity's webpage, an advertisement for placement within a webpage or an app, a user's blog, an entity's chat assistant, and so forth.

To optimize the manner in which a search engine associates instances of content with a query, the system first provides, as inputs to a first foundation model, the instance of content along with a request to summarize the instance of content. As further described below, the instance of content can include multiple characteristics that a content creator intends to communicate and/or publicize via the instance of content. For instance, a webpage for a grocery store may highlight a number of services and/or products the grocery store offers.

The system receives, as an output from the first foundation model, the summary of the instance of content. Accordingly, the first foundation model is trained to analyze a body of text that comprises all or some of the instance of content and generate a shortened version of the body of text, referred to herein as a summary of the instance of content. In one example, the summary of the instance of content is limited to a threshold size (e.g., a predefined number of characters, a predefined number of words, a predefined number of sentences). Naturally, by shortening a body of text, there is a chance that some of the characteristics that the content creator intends to communicate and/or publicize via the instance of content are not described in the summary of the instance of content. Stated alternatively, the first foundation model may fail to include, or exclude, some of the characteristics in the summary of the instance of content. This exclusion may be insignificant if an excluded characteristic is a less important characteristic in the eyes of the content creator. However, this exclusion may be significant if the excluded characteristic is a more important characteristic in the eyes of the content creator.

To ensure that the first foundation model generates a summary of the instance of content that includes characteristics that are deemed more important by the content creator, the system is configured to receive, from the content creator, target characteristics for a corresponding instance of content. The target characteristics are defined by the content creator in accordance with a goal related to public perception and/or consumption. Stated alternatively, the goal reflects how the content creator wants the general public to initially perceive the instance of content. Therefore, the target characteristics reflect the qualities of the instance of content that the content creator believes are more important for the general public to notice or be informed about when being viewed through an LLM, for example. In one example, the target characteristics can be provided via a list, and thus, can be readily identified. In another example, the target characteristics can be deduced from a content creator's own summary of the instance of content.

After the system receives the summary of the instance of content from the first foundation model, the system accesses the target characteristics associated with the instance of content, as separately defined by the content creator. The system then provides, as inputs to a second foundation model, the summary of the instance of content output by the first foundation model, the target characteristics, and a request to determine whether the summary of the instance of content output by the first foundation model aligns with the target characteristics. The second foundation model is trained to compare the summary of the instance of content output by the first foundation model to the target characteristics and determine whether any of the target characteristics are excluded (e.g., missing) from the summary of the instance of content. The second foundation model can be further trained to determine whether any of the target characteristics, although mentioned, are not effectively described. The summary of the instance of content output by the first foundation model aligns with the target characteristics if all the target characteristics are included and/or described in an effective manner. The summary of the instance of content output by the first foundation model does not align with the target characteristics if not all the target characteristics are included and/or described in an effective manner.

Accordingly, the system receives, as an output from the second foundation model, an indication of whether the summary of the instance of content aligns with the target characteristics associated with the instance of content. The indication either confirms or denies that the summary of the instance of content aligns with the target characteristics.

If the indication confirms that the summary of the instance of content aligns with the target characteristics, then the summary of the instance of content output by the first foundation model suits the goal of the content creator and the system provides the summary of the instance of content for use by a search engine, e.g., for query matching purposes. For instance, a generative AI model (e.g., a LLM) can use a large collection of summaries to more efficiently match and/or rank instances of content with an understood context of a query (e.g., a search query, a prompt, a question entered into a chat assistant).

However, if the second foundation model and the indication denies that the summary of the instance of content aligns with the target characteristics, then the second foundation model further provides, as an output, the identifications of the target characteristics that are not included and/or described in an effective manner. In this scenario, the summary of the instance of content output by the first foundation model does not suit the goal of the content creator. Accordingly, the system repeats the process described above and again provides, as an additional round of inputs to the first foundation model, a request to re-summarize the instance of content along with the identification of at least one target characteristic that caused the alignment failure, e.g., the target characteristic that is not included and/or described in an effective manner.

Consequently, the second foundation model is used to automate the feedback process by informing the first foundation model of target characteristics that need to be added to the previous version of the summary of the instance of content and/or that need to be described more effectively in the previous version summary of the instance of content. The feedback loop can be repeated multiples times until the summary of the instance of content, as generated by the first foundation model, is determined by the second foundation model to align with the target characteristics. In other words, the summary of the instance of content, as generated by the first foundation model, is determined by the second foundation model to converge with the goal of the content creator.

By using the techniques described herein, the complete context of an instance of content is understood in a manner that the content creator intends. This contextual understanding enables more relevant and precise matching between content and a query (e.g., a search query, a prompt submitted to an LLM, a question submitted to a chat assistant) which, in turn, improves the user experience, user engagement, and/or user click through rates. Furthermore, this contextual understanding avoids keyword misinterpretation problems that can arise in the existing keyword matching solutions where a keyword is ambiguous and/or has multiple meanings.

The techniques described herein also conserve resources (e.g., computing resources, storage resources, networking resources) by automating the feedback process to ensure that the summary of an instance of content aligns with the target characteristics defined to reflect a goal of the content creator. Stated alternatively, the feedback process eliminates or significantly reduces the need for manual intervention. Moreover, the system can effectively scale the techniques to efficiently summarize a large collection of instances of content (e.g., webpages) in parallel and continuously.

In one example, the disclosed system is used to optimize content for advertising on LLM-supported search engines by automatically generating summaries of instances of content (e.g., different webpages) that align with a content creator's goals. More specifically, the system can be used to place and/or order URLs and/or advertisements in search results.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4 is a flow diagram showing aspects of a method for optimizing, via the use of foundation models such as LLMs, the manner in which a search engine associates instances of content with a query.

DETAILED DESCRIPTION

The techniques and technologies disclosed herein optimize, via the use of foundation models such as large language models (LLMs), the manner in which a search engine associates instances of content (e.g., webpages or applications ("apps") accessible via uniform resource locators (URLs) or other types of uniform resource identifiers (URIs)) with a query. The system described herein employs a first foundation model to summarize an instance of content. The system the employs a second foundation model to compare the summary of the instance of content generated by the first foundation model to target characteristics defined by a content creator. If the comparison confirms that the summary of the instance of aligns with the target characteristics, the system provides the summary to a search engine for query matching purposes. If the comparison denies that the summary of the instance of aligns with the target characteristics, the system employs the first foundation model to re-summarize the instance of content using feedback received from the second foundation model.

Existing solutions typically use keyword matching to associate instances of content with a query. The keyword matching is used to rank and/or select the instances of the content for optimal display positions, e.g., within a search engine results page (SERP). However, comparing the words submitted in a query to all the words included various instances of content can be costly and slow. Moreover, keyword matching fails to fully understand the context of an instance of content, particularly considering a content creator's goals. For example, keyword matching is susceptible to keyword misinterpretation problems where a keyword is ambiguous and/or has multiple meanings.

Various examples, scenarios, and aspects of the disclosed techniques for optimizing, via the use of foundation models such as LLMs, the manner in which a search engine associates instances of content with a query are described below with reference to FIGS. 1-5.

Figure 1:
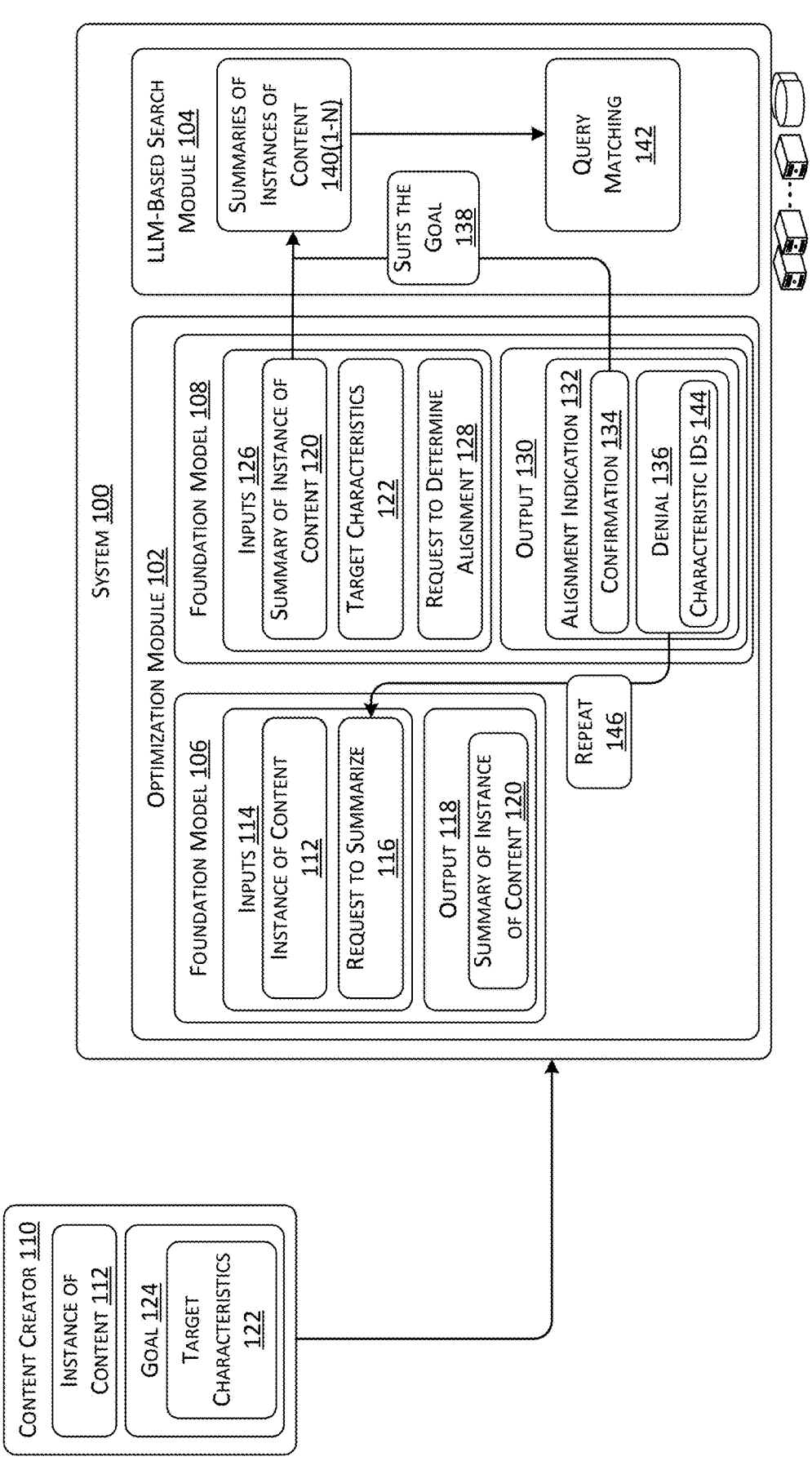
FIG. 1 is a diagram illustrating an example environment in which a system optimizes, via the use of foundation models such as large language models (LLMs), the manner in which a search engine associates instances of content (e.g., webpages or applications ("apps") accessible via uniform resource locators (URLs) or other types of uniform resource identifiers (URIs)) with a query.

FIG. 1 is a diagram illustrating an example environment in which the system 100 optimizes the manner in which a search engine associates instances of content (e.g., webpages or "apps" accessible via URLs or other types of URIs) with a query. The system 100 includes an optimization module 102 and an LLM-based search module 104 (e.g. an LLM-based search engine). The number of modules illustrated in FIG. 1 is just an example, and the number can vary. That is, functionality described herein in association with the illustrated modules can be performed by a fewer number of modules or a larger number of modules on one device (e.g., server) in the system 100 or spread across multiple devices in the system 100.

The optimization module 102 includes a first foundation model 106 and a second foundation model 108, which are both further discussed in greater detail below. A foundation model is a machine or deep learning model that is initially trained on broad data such that it can be applied across a wide range of use cases related to artificial intelligence (AI) and generative AI. FIG. 1 further shows that a content creator 110 generates an instance of content 112. The content creator 110 is an entity (e.g., a person, a company, an agency, an organization, an institution) that offers a product and/or a service or publicizes information that is searchable by users of the Internet. Accordingly, examples of the instance of content 112 include an entity's webpage, an advertisement for placement within a webpage or an app, a user's blog, an entity's chat assistant, and so forth.

To optimize the manner in which the LLM-based search module 104 is able to associates instances of content with a query, the optimization module 102 receives, or accesses, the instance of content 112 from the content creator 110. The optimization module 102 provides, as inputs 114 to the first foundation model 106, the instance of content 112 along with a request 116 to summarize the instance of content 112. As further described below, the instance of content 112 can include multiple characteristics that the content creator 110 intends to communicate and/or publicize via the instance of content 112. For instance, a webpage for a grocery store may highlight a number of services and/or products the grocery store offers.

The optimization module 102 receives, as an output 118 from the first foundation model 106, a summary of the instance of content 120. Accordingly, the first foundation model 106 is trained to analyze a body of text that comprises all or some of the instance of content 112 and generate a shortened version of the body of text, referred to herein as the summary of the instance of content 120. In one example, the summary of the instance of content 120 is limited to a threshold size (e.g., a predefined number of characters, a predefined number of words, a predefined number of sentences). Naturally, by shortening a body of text, there is a chance that some of the characteristics that the content creator 110 intends to communicate and/or publicize via the instance of content 112 are not described in the summary of the instance of content 120. Stated alternatively, the first foundation model 106 may fail to include, or exclude, some of the characteristics in the summary of the instance of content 120. This exclusion may be insignificant if an excluded characteristic is a less important characteristic in the eyes of the content creator 110. However, this exclusion may be significant if the excluded characteristic is a more important characteristic in the eyes of the content creator 110.

To ensure that the first foundation model 106 generates a summary of the instance of content 120 that includes characteristics that are deemed more important by the content creator 110, the optimization module 102 is also configured to receive, from the content creator 110, target characteristics 122 associated with the instance of content 112. The target characteristics 122 are defined by the content creator 110 in accordance with a goal 124 related to public perception and/or consumption. Stated alternatively, the goal 124 reflects how the content creator 110 wants the general public to initially perceive the instance of content 112. Therefore, the target characteristics 122 reflect the qualities of the instance of content 112 that the content creator 110 believes are more important for the general public to notice or be informed about when being viewed through an LLM, for example. In one example, the target characteristics 122 can be provided via a list, and thus, can be readily identified. In another example, the target characteristics 122 can be deduced from a content creator's 110 own summary of instance of content 112.

Next, the optimization module 102 provides, as inputs 126 to the second foundation model 108, the summary of the instance of content 120 output by the first foundation model 106, the target characteristics 122, and a request 128 to determine whether the summary of the instance of content 120 output by the first foundation model 106 aligns with the target characteristics 122. The second foundation model 108 is trained to compare the summary of the instance of content 120 output by the first foundation model 106 to the target characteristics 122 and determine whether any of the target characteristics 122 are excluded (e.g., missing) from the summary of the instance of content 120. The second foundation model 108 can be further trained to determine whether any of the target characteristics 122, although mentioned, are not effectively described. The summary of the instance of content 120 output by the first foundation model 106 aligns with the target characteristics 122 if all the target characteristics 122 are included and/or described in an effective manner. The summary of the instance of content 120 output by the first foundation model 106 does not align with the target characteristics 122 if not all the target characteristics 122 are included and/or described in an effective manner.

Accordingly, the optimization module 102 receives, as an output 130 from the second foundation model 108, an indication 132 of whether the summary of the instance of content 120 aligns with the target characteristics 122 associated with the instance of content 112. The indication 132 either confirms 134 or denies 136 that the summary of the instance of content 120 aligns with the target characteristics 122.

If the indication 132 confirms 134 that the summary of the instance of content 120 aligns with the target characteristics 122, then the summary of the instance of content 120 output by the first foundation model 106 suits 138 the goal 124 of the content creator 110 and the optimization module 102 provides the summary of the instance of content 120 for use by the LLM-based search module 104, e.g., to be added to a collection of summaries of instances of content 140(1-N) for query matching 142 purposes. For instance, a generative AI model (e.g., a LLM) can use the large collection of summaries to more efficiently match and/or rank instances of content with an understood context of a query (e.g., a search query, a prompt, a question entered into a chat assistant).

However, if the second foundation model 108 and the indication 132 denies 136 that the summary of the instance of content 120 aligns with the target characteristics 122, then the second foundation model 108 further provides, as an output 130, identifications 144 of the target characteristics 122 that are not included and/or described in an effective manner. In this scenario, the summary of the instance of content 120 output by the first foundation model 106 does not suit the goal 124 of the content creator 110. Accordingly, the optimization module 102 repeats 146 the process described above and again provides, as an additional round of inputs 114 to the first foundation model 106, a request 116 to summarize, or re-summarize, the instance of content 112 along with the identification 144 of at least one target characteristic 122 that caused the alignment failure, e.g., the target characteristic 122 that is not included and/or described in an effective manner.

Consequently, the second foundation model 108 is used to automate the feedback process by informing the first foundation model 106 of target characteristics 122 that need to be added to the previous version of the summary of the instance of content 120 and/or that need to be described more effectively in the previous version of the summary of the instance of content 120. The feedback loop can be repeated 146 multiples times until the summary of the instance of content 120, as generated by the first foundation model 106, is determined by the second foundation model 108 to align with the target characteristics 122. In other words, the summary of the instance of content 120, as generated by the first foundation model 106, is determined by the second foundation model 108 to converge with the goal 124 of the content creator 110.

By using the techniques described herein, the complete context of an instance of content 112 is understood in a manner that the content creator 110 intends. This contextual understanding enables more relevant and precise matching between content and a query (e.g., a search query, a prompt submitted to an LLM, a question submitted to a chat assistant) which, in turn, improves the user experience, user engagement, and/or user click through rates. Furthermore, this contextual understanding avoids keyword misinterpretation problems that can arise in the existing keyword matching solutions where a keyword is ambiguous and/or has multiple meanings.

The techniques described herein also conserve resources (e.g., computing resources, storage resources, networking resources) by automating the feedback process to ensure that the summary of an instance of content 120 aligns with the target characteristics 122 defined to reflect a goal 124 of the content creator 110. Stated alternatively, the feedback process eliminates or significantly reduces the need for manual intervention. Moreover, the system 100 can effectively scale the techniques to efficiently summarize a large collection of instances of content (e.g., webpages) in parallel and continuously.

In one example, the disclosed system 100 is used to optimize content for advertising on LLM-supported search engines by automatically generating summaries of instances of content (e.g., different webpages) that align with a content creator's goals. More specifically, the system 100 can be used to place and/or order URLs and/or advertisements in search results.

Figure 2A:
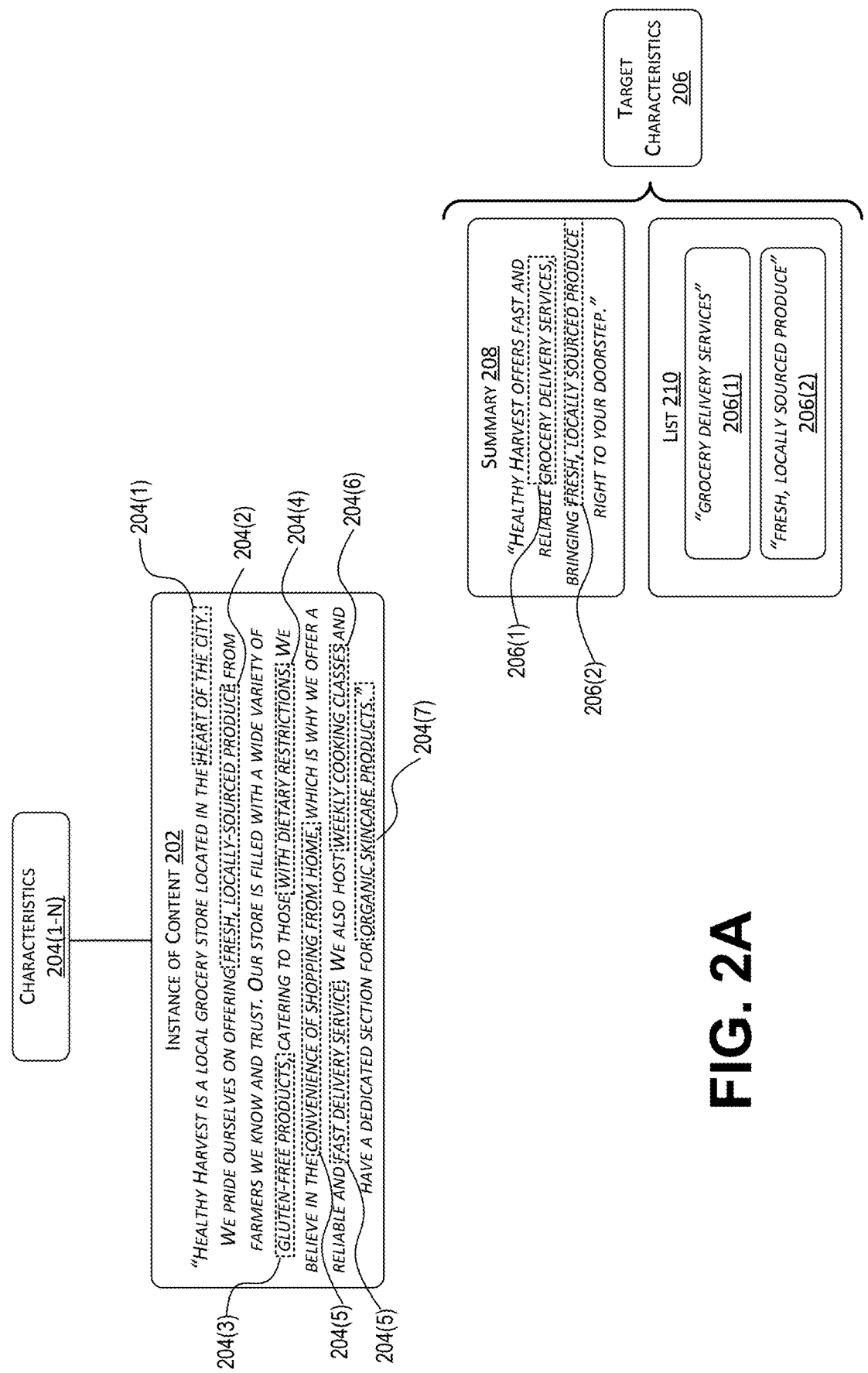
FIG. 2A is a diagram illustrating an example where an instance of content describes characteristics of a grocery store and the grocery store, as the content creator, defines target characteristics that reflect a goal related to public perception and/or consumption.

FIG. 2A is a diagram illustrating an example where an instance of content 202 (e.g., instance of content 112) describes characteristics 204(1-N) of a grocery store and the grocery store, as the content creator, defines target characteristics 122 that reflect a goal 124 related to public perception and/or consumption. As shown in FIG. 2A, the body of text that comprises the instance of content 202 states— "Healthy Harvest is a local grocery store located in the heart of the city. We pride ourselves on offering fresh, locally-sourced produce from farmers we know and trust. Our store is filled with a wide variety of gluten-free products, catering to those with dietary restrictions. We believe in the convenience of shopping from home, which is why we offer a reliable and fast delivery service. We also host weekly cooking classes and have a dedicated section for organic skincare products." Accordingly, the instance of content 202 describes multiple different products and/or services offered by the grocer "Healthy Harvest".

Looking at the body of text, one could deduce that a first characteristic 204(1) relates to "Healthy Harvest" being located in the "heart of the city", that a second characteristic 204(2) relates to "Healthy Harvest" offering "fresh, locally-sourced produce", that a third characteristic 204(3) relates to "Healthy Harvest" being filled with "gluten-free products", that a fourth characteristic 204(4) relates to "Healthy Harvest" catering to people "with dietary restrictions", that a fifth characteristic 204(5) relates to "Healthy Harvest" providing "the convenience of shopping from home" via the use of a "fast delivery service", that a sixth characteristic 204(6) relates to "Healthy Harvest" hosting "weekly cooking classes", and that a seventh characteristic 204(7) relates to "Healthy Harvest" having a dedicated section for "organic skincare products". This example is used for ease of discussion and it is understood, in the context of this document, that the number N of different characteristics 204(1-N) mentioned or described in an instance of content can be more (or less) than the seven highlighted.

Content creators 110, e.g., such as "Healthy Harvest", often have a goal 124 related to the public perception and/or consumption of their instance of content 112, e.g., as it relates to query matching. Furthermore, the goal 124 can reflect a greater focus or priority on some, but not all, of the characteristics 204(1-N) for search purposes. Consequently, a content creator 110 defines target characteristics 122 to reflect the goal 124.

FIG. 2A illustrates two example approaches to defining the target characteristics 206 (e.g., target characteristics 122). In the first example approach, "Healthy Harvest" writes and submits their own summary 208, within which the target characteristics 206 are deduced and/or identified by the first foundation model 106. For instance, a first target characteristic 206(1) in the summary 208 focuses on the "grocery delivery services" and how they are fast and reliable. A second target characteristic 206(2) in the summary 208 focuses on the "fresh, locally sourced produce" that is offered at the store or through the delivery service. In the second example approach, "Healthy Harvest" writes and submits their own list 210 of target characteristics 206. For instance, the first target characteristic 206(1) in the list 210 identifies the "grocery delivery services" and how it is fast and reliable. The second target characteristic 206(2) in the list 210 identifies the "fresh, locally sourced produce" that is offered at the store or through the delivery service.

Figure 2B:
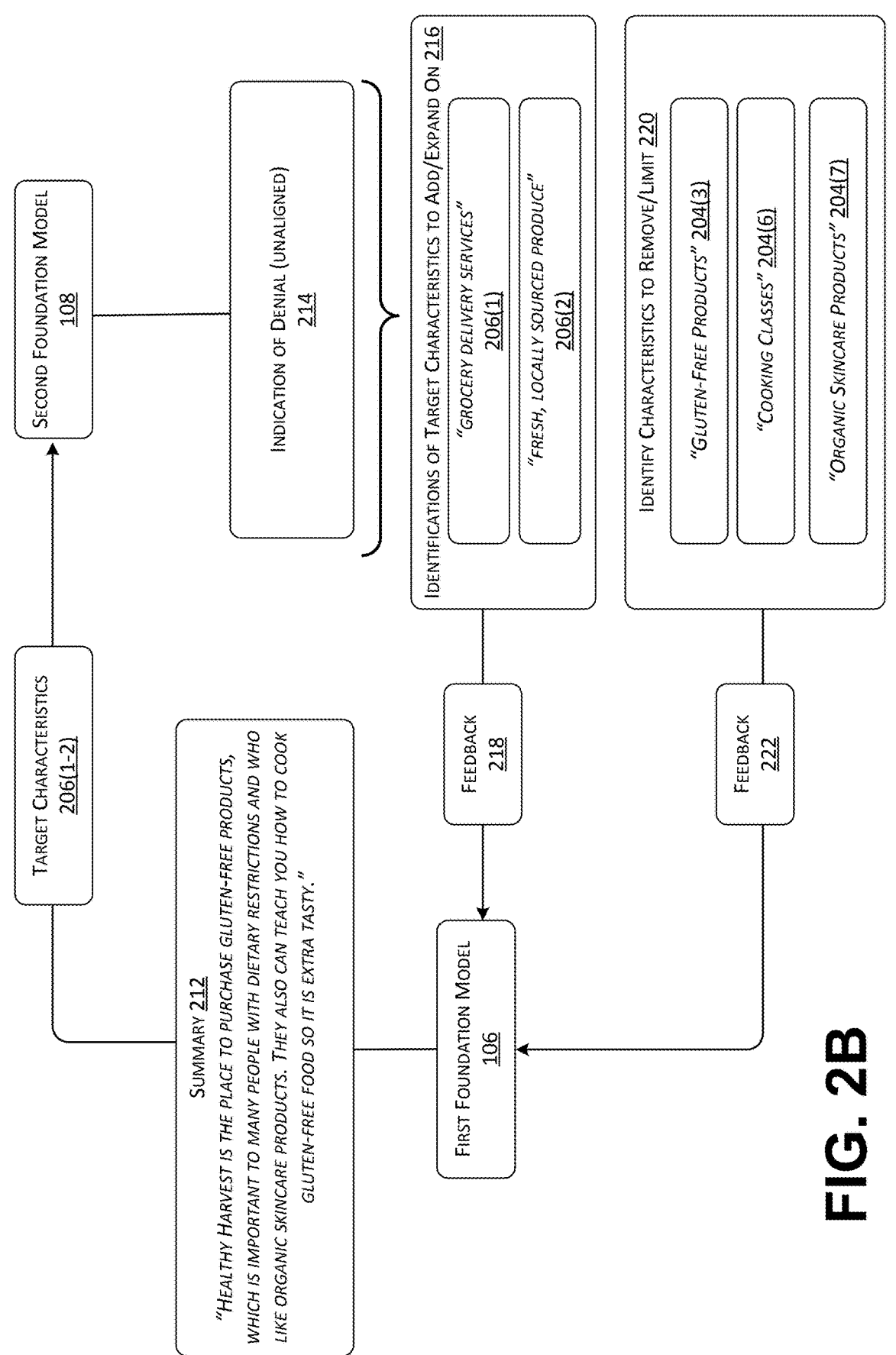
FIG. 2B is a diagram illustrating a continuance of the example in FIG. 2A where a summary of the instance of content is determined to not align with the target characteristics.

FIG. 2B is a diagram illustrating a continuance of the example in FIG. 2A where a summary of the instance of content is determined to not align with the target characteristics. FIG. 2B shows a summary 212 of the instance of content 202 in FIG. 2A, as generated by the first foundation model 106. The summary 212 states "Healthy Harvest is the place to purchase gluten-free products, which is important to many people with dietary restrictions and who like organic skincare products. They also can teach you how to cook gluten-free food so it is extra tasty."

The summary 212 is provided as an input 114 to the second foundation model 108 along with the target characteristics 206(1-2). The second foundation model 108 generates, as an output 118, an indication of denial 214 (e.g., elements 132 and 136 in FIG. 1), which means that the second foundation model 108 has determined, based on a comparison, that the version of the summary 212 first generated by the first foundation model 106 is unaligned with the target characteristics 206(1-2).

In association with the indication of denial 214, the second foundation model 108 provides identifications 216 of missing or lacking target characteristics for which the summary 212 needs to add a description and/or expand on a limited description. For instance, the summary 212 includes no description of the target characteristic 206(1)—"grocery delivery services". Nor does the summary 212 include a description of the target characteristic 206(2)—"fresh, locally sourced produce". Accordingly, a first type of feedback 218 generated by the second foundation model 108, for use by the first foundation model 106, includes identifications 216 of target missing or lacking target characteristics for which the summary 212 needs to add a description and/or expand on a limited description.

In various examples, the second foundation model 108 can also provide identifications 220 of characteristics for which the summary 212 can remove a description and/or limit a description. For instance, the summary 212 includes a description of the characteristic 204(3)—"gluten-free products"—and this characteristic has not been defined by "Healthy Harvest" as a target characteristic 206. Similarly, the summary 212 includes a description of the characteristics 204(6) and 204(7)—"cooking classes" and "organic skincare products"—and these characteristics have also not been defined by "Healthy Harvest" as a target characteristic 206. Accordingly, a second type of feedback 222 generated by the second foundation model 108, for use by the first foundation model 106, includes identifications 220 of target missing or lacking target characteristics for which the summary 212 of characteristics for which the summary 212 can remove a description and/or limit a description.

Figure 2C:
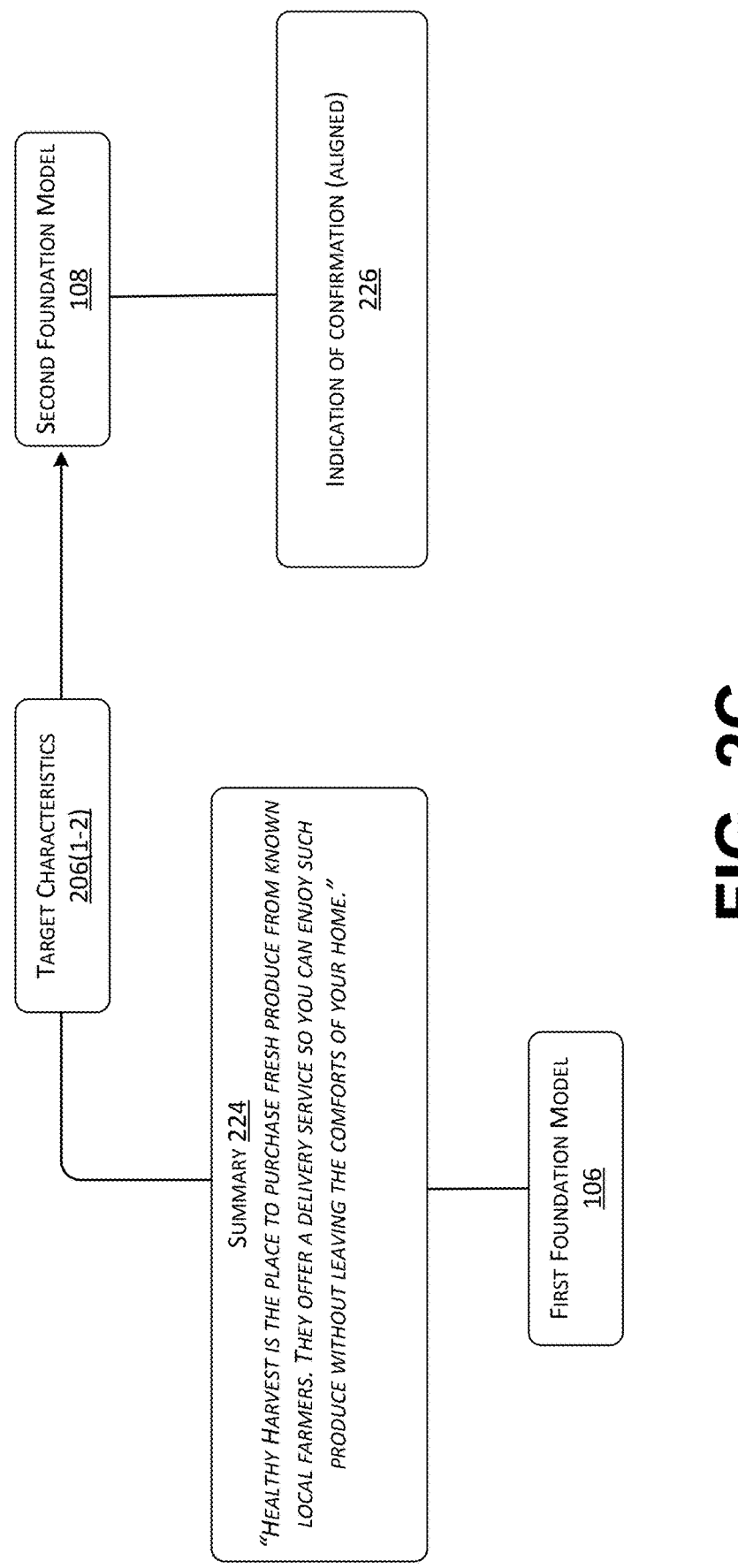
FIG. 2C is a diagram illustrating a continuance of the example in FIGS. 2A and 2B where a summary of the instance of content is determined to align with the target characteristics.

FIG. 2C is a diagram illustrating a continuance of the example in FIGS. 2A and 2B where the first foundation model generates a new summary 224 of the instance of content based on the feedback 218 and/or 222. The new summary 224 states "Healthy Harvest is the place to purchase fresh produce from known local farmers. They offer a delivery service so you can enjoy such produce without leaving the comforts of your home."

As part of another iteration, the new summary 224 is provided as an input 114 to the second foundation model 108 along with the target characteristics 206(1-2). However, in the example of FIG. 2C, the second foundation model 208 generates, as an output 118, an indication of confirmation 226 (e.g., elements 132 and 134 in FIG. 1), which means that the second foundation model 108 has determined, based on a comparison, that the newer version of the summary 224 generated by the first foundation model 106 is aligned with the target characteristics 206(1-2).

Figure 3:
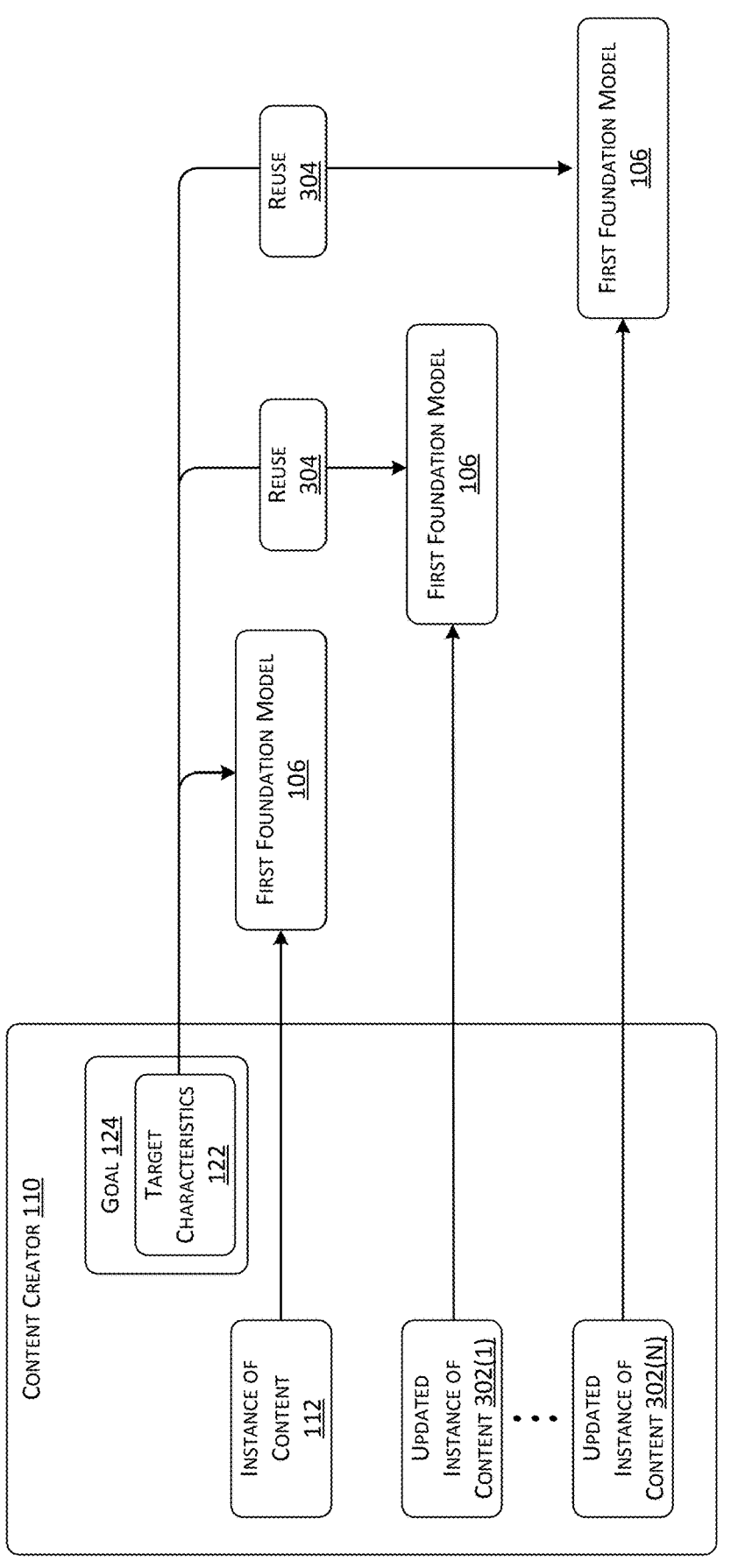
FIG. 3 is a diagram illustrating how defined target characteristics can be reused for updated instances of content.

FIG. 3 is a diagram illustrating how defined target characteristics can be reused for updated instances of content, e.g., associated with the same URI or URL. Accordingly, FIG. 3 illustrates that the content creator 110 has provided, over time, updates to the instance of content 112 in the form of updated instances of content 302(1-N). The optimization module 102 may receive an indication that the same URI or URL includes an updated instance of content 302(1). In one example, the URI or URL can refer to a blog and updated instance of content 302(1) is a new blog post.

As discussed with respect to FIG. 1, the instance of content 112 is provided to the first foundation model 106 in order to generate a suitable summary that aligns with the target characteristics 122. However, when the optimization module 102 is made aware of the updated instance of content 302(1), the process in FIG. 1 can be performed on the updated instance of content 302(1) without requiring the content creator 110 to provide a new set of target characteristics 122. Rather, the initially defined target characteristics can be reused 304 for the updated instances of the content 302(1-N).

Proceeding to FIG. 4, aspects of a method 400 for optimizing, via the use of foundation models such as LLMs, the manner in which a search engine associates instances of content with a query are shown. With respect to FIG. 4, the process 400 begins at operation 402 where the system provides, as first inputs to a first foundation model, an instance of content and a first request to summarize the instance of content.

At operation 404, the system receives, as a first output from the first foundation model, a summary of the instance of content.

At operation 406, the system provides, as second inputs to a second foundation model, the summary of the instance of content, target characteristics associated with the instance of content, and a second request to determine whether the summary of the instance of content aligns with the target characteristics. As described above, the target characteristics are defined by a creator of the instance of content.

At operation 408, the system receives, as a second output from the second foundation model, an indication confirming or denying that the summary of the instance of content aligns with the target characteristics associated with the instance of content.

Based on the indication denying that the summary of the instance of content aligns with the target characteristics associated with the instance of content, the method proceeds to operation 410 where the system provides, as third inputs to the first foundation model, an identification of at least one of the target characteristics that caused the alignment denial and a third request to re-summarize the instance of content while considering the at least one of the target characteristics that caused the alignment denial.

Based on the indication confirming that the summary of the instance of content aligns with the target characteristics associated with the instance of content, the method proceeds to operation 412 where the system provides the summary of the instance of content to a search engine for query matching purposes.

For ease of understanding, the method discussed in this disclosure is delineated as separate operations represented as independent blocks. However, these separately delineated operations should not be construed as necessarily order dependent in their performance. The order in which the method is described is not intended to be construed as a limitation, and any number of the described method blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the method 400 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the method 400 may also be implemented in other ways. In addition, one or more of the operations of the method 400 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 5:
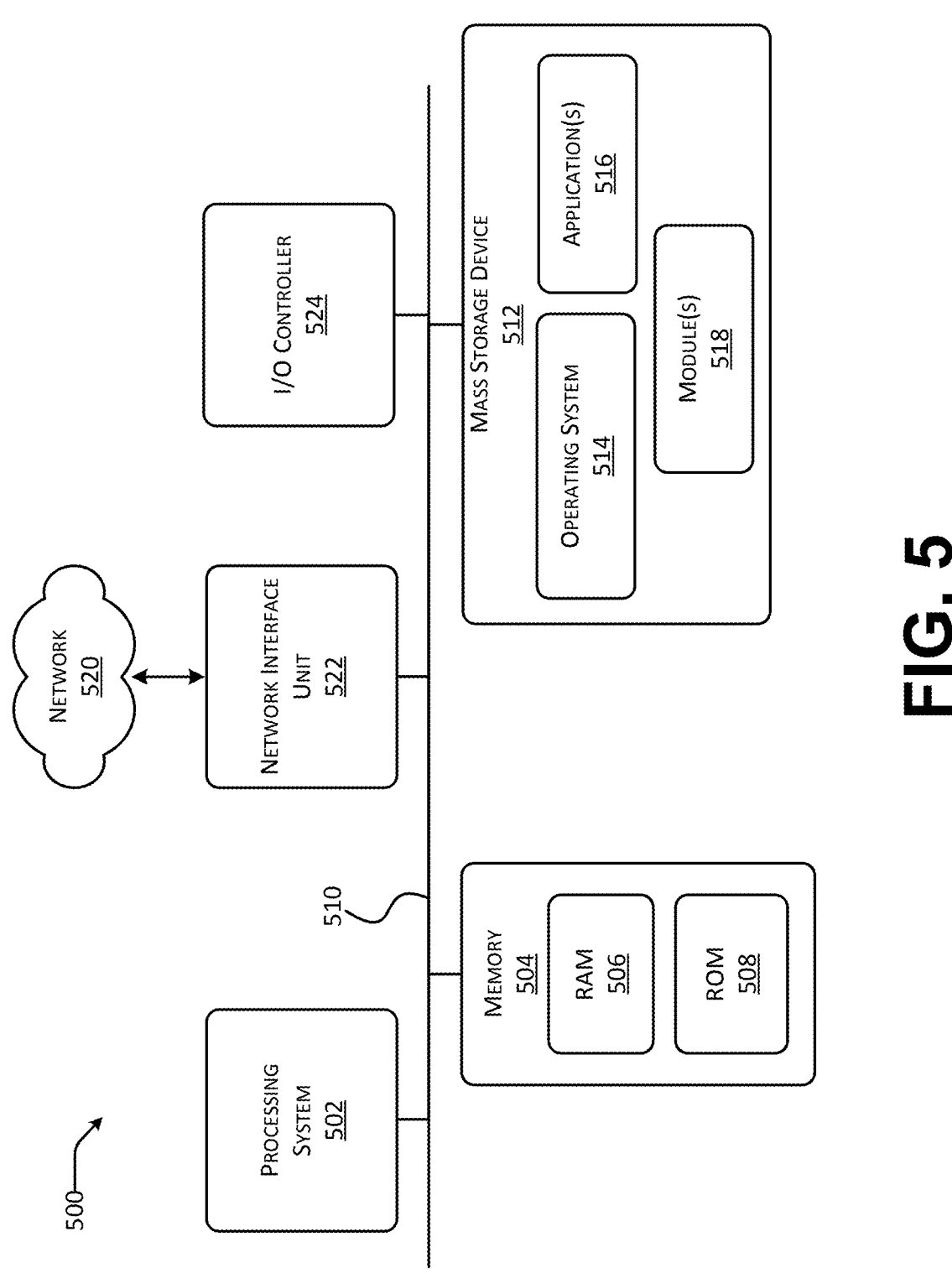
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the system 100, capable of executing computer instructions (e.g., a module described herein). The computer architecture 500 illustrated in FIG. 5 includes processing system 502, a system memory 504, including a random-access memory 506 (RAM) and a read-only memory (ROM) 508, and a system bus 510 that couples the memory 504 to the processing system 502. The processing system 502 comprises processing unit(s). In various examples, the processing unit(s) of the processing system 502 are distributed. Stated another way, one processing unit of the processing system 502 may be located in a first location (e.g., a rack within a datacenter) while another processing unit of the processing system 502 is located in a second location separate from the first location.

Processing unit(s), such as processing unit(s) of processing system 502, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing system 502 through a mass storage controller connected to the bus 510. The mass storage device 512 and its associated computer-readable media provide non-volatile storage for the computer architecture 500. Although the description of computer-readable media contained herein refers to a mass storage device, the computer-readable media can be any available computer-readable storage media or communication media that can be accessed by the computer architecture 500.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

The software components described herein may, when loaded into the processing system 502 and executed, transform the processing system 502 and the overall computer architecture 500 from a general-purpose computing system into a special-purpose computing system customized to facilitate the functionality presented herein. The processing system 502 may be constructed from any number of transistors or other discrete circuit elements, which may individually or collectively assume any number of states. More specifically, the processing system 502 may operate as a finite-state machine, in response to executable instructions contained within the software modules disclosed herein. These computer-executable instructions may transform the processing system 502 by specifying how the processing system 502 transition between states, thereby transforming the transistors or other discrete hardware elements constituting the processing system 502.

The disclosure presented herein also encompasses the subject matter set forth in the following clauses.

Example Clause A, a system comprising: a processing system; and computer storage media storing instructions that, when executed by the processing system, cause the system to perform operations comprising: providing, as first inputs to a first foundation model, an instance of content and a first request to summarize the instance of content; receiving, as a first output from the first foundation model, a summary of the instance of content; providing, as second inputs to a second foundation model, the summary of the instance of content, target characteristics associated with the instance of content, and a second request to determine whether the summary of the instance of content aligns with the target characteristics associated with the instance of content, wherein the target characteristics are defined by a creator of the instance of content; receiving, as a second output from the second foundation model, an indication denying that the summary of the instance of content aligns with the target characteristics associated with the instance of content; and based on the indication denying that the summary of the instance of content aligns with the target characteristics associated with the instance of content, providing, as third inputs to the first foundation model, an identification of at least one of the target characteristics that caused the alignment denial and a third request to re-summarize the instance of content while considering the at least one of the target characteristics that caused the alignment denial.

Example Clause B, the system of Example Clause A, wherein the first foundation model and the second foundation model are large language models.

Example Clause C, the system of Example Clause A or Example Clause B, wherein the target characteristics are defined to reflect a goal of the creator of the instance of content for query matching purposes.

Example Clause D, the system of any one of Example Clauses A through C, wherein the system continues to request that the first foundation model re-summarize the instance of content until the second foundation model confirms that a suitable summary of the instance of content aligns with the target characteristics associated with the instance of content.

Example Clause E, the system of any one of Example Clauses A through D, wherein: the second output from the second foundation model includes another identification of another characteristic that is not included in the target characteristics and that can be removed from the summary of the instance of content; and the other identification is provided as one of the third inputs to the first foundation model.

Example Clause F, the system of any one of Example Clauses A through E, wherein the at least one of the target characteristics that caused the alignment denial is one that is missing in the summary of the instance of content.

Example Clause G, the system of any one of Example Clauses A through F, wherein the at least one of the target characteristics that caused the alignment denial is one that is mentioned in the summary of the instance of content but is determined by the second foundation model to not have been effectively described.

Example Clause H, a system comprising: a processing system; and computer storage media storing instructions that, when executed by the processing system, cause the system to perform operations comprising: providing, as first inputs to a first foundation model, an instance of content and a first request to summarize the instance of content; receiving, as a first output from the first foundation model, a summary of the instance of content; providing, as second inputs to a second foundation model, the summary of the instance of content, target characteristics associated with the instance of content, and a second request to determine whether the summary of the instance of content aligns with the target characteristics associated with the instance of content, wherein the target characteristics are defined by a creator of the instance of content; receiving, as a second output from the second foundation model, an indication confirming that the summary of the instance of content aligns with the target characteristics associated with the instance of content; and based on the indication confirming that the summary of the instance of content aligns with the target characteristics associated with the instance of content, providing the summary of the instance of content to a search engine for query matching purposes.

Example Clause I, the system of Example Clause H, wherein the instance of content is associated with a uniform resource identifier, and the operations further comprise: receiving an indication that the uniform resource locator includes an updated instance of content; providing, as fourth inputs to the first foundation model, the updated instance of content and a fourth request to summarize the updated instance of content; receiving, as a third output from the first foundation model, a summary of the updated instance of content; providing, as fifth inputs to the second foundation model, the summary of the updated instance of content, the target characteristics defined for the instance of content, and a fifth request to determine whether the summary of the updated instance of content aligns with the target characteristics defined for the instance of content; receiving, as a fourth output from the second foundation model, an indication confirming that the summary of the updated instance of content aligns with the target characteristics defined for the instance of content; based on the indication confirming that the summary of the updated instance of content aligns with the target characteristics defined for the instance of content, providing the summary of the updated instance of content to the search engine for query matching purposes.

Example Clause J, the system of Example Clause H or Example Clause I, wherein the first foundation model and the second foundation model are large language models.

Example Clause K, the system of any one of Example Clauses H through J, wherein the target characteristics are defined to reflect a goal of the creator of the instance of content for query matching purposes.

Example Clause L, the system of any one of Example Clauses H through K, wherein the summary of the instance of content is limited to a threshold size.

Example Clause M, a method comprising: providing, as first inputs to a first foundation model, an instance of content and a first request to summarize the instance of content; receiving, as a first output from the first foundation model, a summary of the instance of content; providing, as second inputs to a second foundation model, the summary of the instance of content, target characteristics associated with the instance of content, and a second request to determine whether the summary of the instance of content aligns with the target characteristics associated with the instance of content, wherein the target characteristics are defined by a creator of the instance of content; receiving, as a second output from the second foundation model, an indication denying that the summary of the instance of content aligns with the target characteristics associated with the instance of content; and based on the indication denying that the summary of the instance of content aligns with the target characteristics associated with the instance of content, providing, as third inputs to the first foundation model, an identification of at least one of the target characteristics that caused the alignment denial and a third request to re-summarize the instance of content while considering the at least one of the target characteristics that caused the alignment denial.

Example Clause N, the method of Example Clause M, wherein the first foundation model and the second foundation model are large language models.

Example Clause O, the method of Example Clause M or Example Clause N, wherein the target characteristics are defined to reflect a goal of the creator of the instance of content for query matching purposes.

Example Clause P, the method of any one of Example Clauses M through O, further comprising continually requesting that the first foundation model re-summarize the instance of content until the second foundation model confirms that a suitable summary of the instance of content aligns with the target characteristics associated with the instance of content.

Example Clause Q, the method of any one of Example Clauses M through P, wherein: the second output from the second foundation model includes another identification of another characteristic that is not included in the target characteristics and that can be removed from the summary of the instance of content; and the other identification is provided as one of the third inputs to the first foundation model.

Example Clause R, the method of any one of Example Clauses M through Q, wherein the at least one of the target characteristics that caused the alignment denial is one that is missing in the summary of the instance of content.

Example Clause S, the method of any one of Example Clauses M through R, wherein the at least one of the target characteristics that caused the alignment denial is one that is mentioned in the summary of the instance of content but is determined by the second foundation model to not have been effectively described.

Example Clause T, the method of any one of Example Clauses M through S, wherein the summary of the instance of content is limited to a threshold size.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:

a processing system; and computer storage media storing instructions that, when executed by the processing system, cause the system to perform operations comprising:

providing, as first inputs to a first foundation model, an instance of content and a first request to summarize the instance of content;

receiving, as a first output from the first foundation model, a summary of the instance of content;

providing, as second inputs to a second foundation model, the summary of the instance of content, target characteristics associated with the instance of content, and a second request to determine whether the summary of the instance of content aligns with the target characteristics associated with the instance of content, wherein the target characteristics are defined by a creator of the instance of content to reflect qualities of the instance of content to be noticed for public consumption and are separate from the instance of content;

receiving, as a second output from the second foundation model, an indication denying that the summary of the instance of content aligns with the target characteristics associated with the instance of content; and based on the indication denying that the summary of the instance of content aligns with the target characteristics associated with the instance of content, providing, as third inputs to the first foundation model, an identification of at least one of the target characteristics that caused the alignment denial and a third request to re-summarize the instance of content while considering the at least one of the target characteristics that caused the alignment denial.

2. The system of claim 1, wherein the first foundation model and the second foundation model are large language models.

3. The system of claim 1, wherein the target characteristics are further defined to reflect a goal of the creator of the instance of content for query matching purposes.

4. The system of claim 1, wherein the system continues to request that the first foundation model re-summarize the instance of content until the second foundation model confirms that a suitable summary of the instance of content aligns with the target characteristics associated with the instance of content.

5. The system of claim 1, wherein:

the second output from the second foundation model includes another identification of another characteristic that is not included in the target characteristics and that can be removed from the summary of the instance of content; and the other identification is provided as one of the third inputs to the first foundation model.

6. The system of claim 1, wherein the at least one of the target characteristics that caused the alignment denial is one that is missing in the summary of the instance of content.

7. The system of claim 1, wherein the at least one of the target characteristics that caused the alignment denial is one that is mentioned in the summary of the instance of content but is determined by the second foundation model to not have been effectively described.

8. A system comprising:

a processing system; and computer storage media storing instructions that, when executed by the processing system, cause the system to perform operations comprising:

providing, as first inputs to a first foundation model, an instance of content and a first request to summarize the instance of content;

receiving, as a first output from the first foundation model, a summary of the instance of content;

providing, as second inputs to a second foundation model, the summary of the instance of content, target characteristics associated with the instance of content, and a second request to determine whether the summary of the instance of content aligns with the target characteristics associated with the instance of content, wherein the target characteristics are defined by a creator of the instance of content to reflect qualities of the instance of content to be noticed for public consumption and are separate from the instance of content;

receiving, as a second output from the second foundation model, an indication confirming that the summary of the instance of content aligns with the target characteristics associated with the instance of content; and based on the indication confirming that the summary of the instance of content aligns with the target characteristics associated with the instance of content, providing the summary of the instance of content to a search engine for query matching purposes.

9. The system of claim 8, wherein the instance of content is associated with a uniform resource identifier, and the operations further comprise:

receiving an indication that the uniform resource locator includes an updated instance of content;

providing, as fourth inputs to the first foundation model, the updated instance of content and a fourth request to summarize the updated instance of content;

receiving, as a third output from the first foundation model, a summary of the updated instance of content;

providing, as fifth inputs to the second foundation model, the summary of the updated instance of content, the target characteristics defined for the instance of content, and a fifth request to determine whether the summary of the updated instance of content aligns with the target characteristics defined for the instance of content;

receiving, as a fourth output from the second foundation model, an indication confirming that the summary of the updated instance of content aligns with the target characteristics defined for the instance of content;

based on the indication confirming that the summary of the updated instance of content aligns with the target characteristics defined for the instance of content, providing the summary of the updated instance of content to the search engine for query matching purposes.

10. The system of claim 8, wherein the first foundation model and the second foundation model are large language models.

11. The system of claim 8, wherein the target characteristics are further defined to reflect a goal of the creator of the instance of content for query matching purposes.

12. The system of claim 8, wherein the summary of the instance of content is limited to a threshold size.

13. A method comprising:

providing, as first inputs to a first foundation model, an instance of content and a first request to summarize the instance of content;

receiving, as a first output from the first foundation model, a summary of the instance of content;

providing, as second inputs to a second foundation model, the summary of the instance of content, target characteristics associated with the instance of content, and a second request to determine whether the summary of the instance of content aligns with the target characteristics associated with the instance of content, wherein the target characteristics are defined by a creator of the instance of content to reflect qualities of the instance of content to be noticed for public consumption and are separate from the instance of content;

receiving, as a second output from the second foundation model, an indication denying that the summary of the instance of content aligns with the target characteristics associated with the instance of content; and based on the indication denying that the summary of the instance of content aligns with the target characteristics associated with the instance of content, providing, as third inputs to the first foundation model, an identification of at least one of the target characteristics that caused the alignment denial and a third request to re-summarize the instance of content while considering the at least one of the target characteristics that caused the alignment denial.

14. The method of claim 13, wherein the first foundation model and the second foundation model are large language models.

15. The method of claim 13, wherein the target characteristics are further defined to reflect a goal of the creator of the instance of content for query matching purposes.

16. The method of claim 13, further comprising continually requesting that the first foundation model re-summarize the instance of content until the second foundation model confirms that a suitable summary of the instance of content aligns with the target characteristics associated with the instance of content.

17. The method of claim 13, wherein:

the second output from the second foundation model includes another identification of another characteristic that is not included in the target characteristics and that can be removed from the summary of the instance of content; and the other identification is provided as one of the third inputs to the first foundation model.

18. The method of claim 13, wherein the at least one of the target characteristics that caused the alignment denial is one that is missing in the summary of the instance of content.

19. The method of claim 13, wherein the at least one of the target characteristics that caused the alignment denial is one that is mentioned in the summary of the instance of content but is determined by the second foundation model to not have been effectively described.

20. The system of claim 13, wherein the summary of the instance of content is limited to a threshold size.

* * * * *